(12) United States Patent
Trigonakis et al.

(10) Patent No.: US 12,361,068 B2
(45) Date of Patent: Jul. 15, 2025

(54) DISTRIBUTED MULTI-HOP NEIGHBORHOOD EXTRACTION FOR GRAPH MACHINE-LEARNING VIA PUSH-LAZY-PUSH-TRAVERSAL

(71) Applicant: Oracle International Corporation, Redwood Shores, CA (US)

(72) Inventors: Vasileios Trigonakis, Zurich (CH); Lukas Kapp-Schwoerer, Redwood City, CA (US); Jonas Schweizer, Schlieren (CH); Arnaud Delamare, Zurich (CH); Damien Hilloulin, Zurich (CH); Vlad Ioan Haprian, Zurich (CH); Sungpack Hong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/593,663

(22) Filed: Mar. 1, 2024

(65) Prior Publication Data
US 2025/0200109 A1     Jun. 19, 2025

Related U.S. Application Data

(60) Provisional application No. 63/612,132, filed on Dec. 19, 2023.

(51) Int. Cl.
*G06F 15/16* (2006.01)
*G06F 16/27* (2019.01)
*G06F 16/901* (2019.01)

(52) U.S. Cl.
CPC ........ *G06F 16/9024* (2019.01); *G06F 16/278* (2019.01)

(58) Field of Classification Search
None
See application file for complete search history.

(56) References Cited

U.S. PATENT DOCUMENTS

| 8,234,233 | B2 | 7/2012 | Zhou |
| 8,543,517 | B2 | 9/2013 | Shotton |
| (Continued) | | | |

FOREIGN PATENT DOCUMENTS

EP     2743845     6/2014

OTHER PUBLICATIONS

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

(Continued)

*Primary Examiner* — Alex Gofman
(74) *Attorney, Agent, or Firm* — Hickman Becker Bingham Ledesma LLP

(57) ABSTRACT

A sampling procedure is performed for paths on a multi-hop distributed graph that includes vertices partitioned on a plurality of machines; a sampled path includes first and second vertices hosted on first and second machines respectively. The sampling procedure includes communicating, by the first machine to the second machine, first path information comprising an identifier for the second vertex and an identifier for a target vertex of the sampled path; the target vertex is hosted on a target host machine. The procedure further includes communicating edge information by the first machine to the target host machine, and communicating feature information by the second machine to the target host machine. Communication of the edge information and communication of the feature information are deferred relative to communication of the first path information.

20 Claims, 8 Drawing Sheets

(56) References Cited

U.S. PATENT DOCUMENTS

| | | |
|---|---|---|
| 9,135,565 B1 | 9/2015 | Khalefa |
| 10,140,336 B1 | 11/2018 | Gu |
| 11,194,815 B1 | 12/2021 | Kumar |
| 11,675,785 B2 | 6/2023 | Trigonakis et al. |
| 2005/0015511 A1 | 1/2005 | Izmailov |
| 2005/0097078 A1 | 5/2005 | Lohman |
| 2012/0109889 A1 | 5/2012 | Wu |
| 2012/0209886 A1 | 8/2012 | Henderson |
| 2013/0097599 A1 | 4/2013 | Konik |
| 2014/0067793 A1 | 3/2014 | Shironoshita |
| 2014/0108414 A1 | 4/2014 | Stillerman |
| 2015/0089514 A1 | 3/2015 | Grewal |
| 2015/0193500 A1 | 7/2015 | Aute |
| 2015/0261817 A1 | 9/2015 | Harris |
| 2016/0306896 A1 | 10/2016 | Paradies |
| 2017/0091246 A1 | 3/2017 | Risvik |
| 2017/0116271 A1 | 4/2017 | Ziauddin |
| 2017/0118042 A1 | 4/2017 | Bhattacharya |
| 2017/0139991 A1 | 5/2017 | Teletia |
| 2018/0046675 A1 | 2/2018 | Zhou |
| 2018/0157978 A1 | 6/2018 | Buda |
| 2018/0329958 A1 | 11/2018 | Choudhury |
| 2019/0384765 A1 | 12/2019 | White |
| 2020/0380032 A1 | 12/2020 | Wills et al. |
| 2020/0401625 A1 | 12/2020 | Wright |
| 2021/0049171 A1 | 2/2021 | Ziauddin |
| 2021/0049209 A1* | 2/2021 | Shi .................... G06N 20/00 |
| 2021/0089580 A1 | 3/2021 | Deng |
| 2021/0191941 A1 | 6/2021 | Petride |
| 2021/0240705 A1 | 8/2021 | Trigonakis |
| 2021/0365457 A1 | 11/2021 | Venema et al. |
| 2022/0179859 A1 | 6/2022 | Faltin et al. |

OTHER PUBLICATIONS

Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.

Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.

Khandelwal et al., "ZipG: A Memory-Efficient Graph Store for Interactive Queries", SIGMOD 2017, DOI: http://dx.doi.org/10.1145/3035918.3064012, dated May 2017, 16 pages.

Kankanamge et al., "Graphflow: An Active Graph Database", SIGMOD 2017, DOI: http://dx.doi.org/10.1145/3035918.3056445, dated May 2017, 4 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Hong et al., "Pgx.D: A Fast Distributed Graph Processing Engine", High Performance Computing, Networking and Storage Conference, SC 2015, DOI: http://dx.org/10.1145/2807591.2807620, dated Nov. 2015, 12 pages.

Abdelaziz et al., "Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Dekel et al., "Cachesensitive Optimization of Immutable Graph Taversals (CS745 Project Report)", ACM, dated 2015, 9 pages.

Ma et al., "G-SQL: Fast Query Processing via Graph Exploration", Proceedings of the VLDB Endowment, vol. 9, No. 12, DOI: 2150-8097/16/08, dated 2016, 12 pages.

Dave et al., GraphFrames: An Integrated API for Mixing Graph and Relational Queries, GRADES 2016, DOI: http://dx.doi.org/10.1145/2960414.2960416, dated Jun. 2016, 8 pages.

Cong et al., "Solving Large, Irregular Graph Problems using Adaptive Work-stealing", dated 2008, 10 pages.

Chen et al., "G-Minor: An Efficient Task-Oriented Graph Mining System", EuroSys 2018, Association for Computing Machinery, https://doi.org/10.1145/3190508.3190545, dated Apr. 2018, 12 pages.

Buleon, "OrientDB—The Multi-Model and Graph Database", Info-H-415: Advanced Databases, http://orientdb.com/docs/last/index.html, dated 2017, 20 pages.

Boncz et al., Breaking the Memory Wall in MonetDB, Communications of the ACM, vol. 15, No. 12, dated Dec. 2008, 9 pages.

Azure Cosmos DB, "Fast NoSQL Database with Open APIs for any Scale", https://azure.microsoft.com/en-gb/services/cosmos-db, dated 2018, 20 pages.

Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Virtuoso Universal Server, "Data-Driven Agility without Compromise", http://virtuoso.openlinksw.com, dated 2019, 10 pages.

Titan.thinkaurelius.com, Chapter 3: Getting Started, s3.thinkaurelius.com/docs/titan/1.0.0/getting-started.html, dated 2015, 8 pages.

The Linux Foundation, "JanusGraph", https://docs.janusgraph.org, dated 2020, 3 pages.

Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

Lumsdaine et al., "Challenges in Parallel Graph Processing", World Scientific Publishing Company, Parallel Processing Letters, dated Jan. 2007, 16 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Lyu et al., "DBL: Reachability Queries on Dynamic Graphs", Technical Report, dated Jan. 4, 2019, 27 pages.

Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

Priya et al., "A Survey on Realizing Memory-Optimized Distributed Graph Processing", IOSR Journal of Engineering (IOSRJEN), vol. 8, Issue 8 dated Aug. 2018, 7 pages.

Page et al., "The PageRank Citation Ranking: Bringing Order to the Web", http://ilpubs.stanford.edu:8090/422/1/1999-66.pdf, dated Jan. 1998, 17 pages.

Openquery.com, "OQGRAPH Engine for MariaDB", https://openquery.com.au/products/graph-engine, dated Apr. 2008, 4 pages.

Müller, "Engineering Aggregation Operators for Relational In-Memory Database Systems", Karlsruhe Institute of Technology, Germany, dated 2016, 197 pages.

Microsoft Graph Engine, "Graph Engine: Serving Big Graphs in Real-Time", https://www.graphengine.io, dated 2017, 2 pages.

Zhang et al., "REGTT: Accelerating Tree Traversals on GPUs by Exploiting Regularities", dated 2016, 10 pages.

Sharma, "Dragon: A Distributed Graph Query Engine", Facebook Engineering, https://code.fb.com/datainfrastructure/dragon-a-distributed-graph-query-engine, dated Mar. 2016, 7 pages.

Faltin, U.S. Appl. No. 18/073,629, filed Dec. 2, 2022, Non-Final Rejection.

Faltin, U.S. Appl. No. 17/116,831, filed Dec. 9, 2020, Notice of Allowance and Fees Due.

Faltin, U.S. Appl. No. 17/116,831, filed Dec. 9, 2020, Final Rejection.

(56) References Cited

OTHER PUBLICATIONS

Faltin, U.S. Appl. No. 17/116,831, filed Dec. 9, 2020, Advisory Action.
Faltin, U.S. Appl. No. 17/116,831, filed Dec. 9, 2020, Non-Final Rejection.
Rahm, "Scalable Graph Analytics", Year 2017, 73 pages.
Holzschuher et al., "Querying a graph database—language selection and performance considerations", 2015, 24 pages.
Curtis-Black et al., "Scout: A Framework for Querying Networks", (Year: 2020).
Trigonakis, U.S. Appl. No. 16/778,668, filed Jan. 31, 2020, Notice of Allowance and Fees Due.
Trigonakis, U.S. Appl. No. 16/778,668, filed Jan. 31, 2020, Non-Final Rejection.
Trigonakis, U.S. Appl. No. 16/778,668, filed Jan. 31, 2020, Advisory Action.
Trigonakis, U.S. Appl. No. 16/778,668, filed Jan. 31, 2020, Final Rejection.
Zheng, D. et al., "Distributed Hybrid CPU and GPU training for Graph Neural Networks on Billion-Scale Heterogeneous Graphs", 11 pages.
Zheng, D. et al., "DistDGL: Distributed Graph Neural Network Training for Billion-Scale Graphs", 2020 IEEE/ACM 10TH Workshop On Irregular Applications: Architectures and Algorithms (IA3), pp. 36-44.
Roth, N. P. et al., "PGX.D/Async: A Scalable Distributed Graph Pattern Matching Engine", 6 pages.
Hamilton, W. et al., "Inductive Representation Learning on Large Graphs", 19 pages.

\* cited by examiner

DISTRIBUTED MULTI-HOP NEIGHBORHOOD EXTRACTION FOR GRAPH MACHINE-LEARNING VIA PUSH-LAZY-PUSH-TRAVERSAL

CROSS-REFERENCE TO RELATED APPLICATIONS

This application claims the benefit of U.S. Provisional Application No. 63/612,132, filed Dec. 19, 2023, which is incorporated herein by reference in its entirety.

This application is related to U.S. application Ser. No. 16/778,668 (now U.S. Pat. No. 11,675,785), titled "Dynamic Asynchronous Traversals for Distributed Graph Queries", filed Jan. 31, 2020, which is incorporated herein by reference in its entirety.

FIELD OF THE INVENTION

The present invention relates to graph machine learning (graph-ML), and more particularly to a procedure (referred to herein as Push-Lazy-Push-Traversal) for extracting multi-hop neighborhoods from large-scale distributed graphs, in order to train graph-ML models on distributed graphs.

BACKGROUND

Graph-ML plays a crucial role in learning and inferring patterns from the structured information available in graphs. In order to learn from a vertex's context, graph-ML models can sample from a vertex's incident edges and neighboring vertices, as well as these neighbors' neighbors, and ultimately consider the multi-hop neighborhood of a target vertex. This approach is shared by most inductive models which learn the weights of a neural network and can subsequently embed vertices in a graph of arbitrary size, as opposed to transductive methods that iteratively update a separate embedding for each vector. In view of the growing need to learn from and analyze large graphs, it is advantageous to implement graph-ML on distributed graphs, where the graph is partitioned and distributed across several machines. With a graph being distributed across multiple machines, the neighbors in a multi-hop neighborhood may be stored on different machines, requiring the machines to coordinate and communicate for extracting multi-hop neighborhoods from a distributed graph.

From a computational perspective, one of the major challenges in graph-ML is the neighborhood explosion encountered when sampling such multi-hop neighborhoods, i.e., the rapid growth of the extracted sub-graph when sampling neighbors of a target vertex for several hops. This can lead to the extraction of batches from a graph becoming the bottleneck in graph-ML pipelines. Therefore, fast graph-ML on graphs requires the efficient extraction of distributed multi-hop neighborhoods. Recent efforts have been focused on solving this problem by specializing either partitioning, e.g., making most neighborhoods local, or partitioning the graph properties vertically, placing some of the properties on one machine each. Nevertheless, graph partitioning is an expensive operation and specializing partitioning for the graph-ML workload inevitably reduces the generality of the resulting partitioning scheme. In order to allow users to employ graph-ML in conjunction with other forms of graph analytics, such as graph queries and algorithms, it is desirable to integrate graph-ML techniques with general purpose graph engines with generic partitioning.

The speed of batch extraction in a distributed computing environment is often limited by data communication (especially without any partitioning specialization). In such a setting, neither standard pull nor push patterns are suitable. On the one hand, pulling the data for building multi-hop neighbors transfers a large amount of data and can be complex-pulling neighborhoods and then following those in a multi-hop fashion can result into pulling large parts of the graphs. On the other hand, graph engines often implement efficient push patterns, but graph-ML algorithms often require extracting hundreds or even thousands of properties out of the graph, hence this pattern can be slow due the amount of data pushed with every hop of the neighborhood sampling.

DETAILED DESCRIPTION

Figure 1:
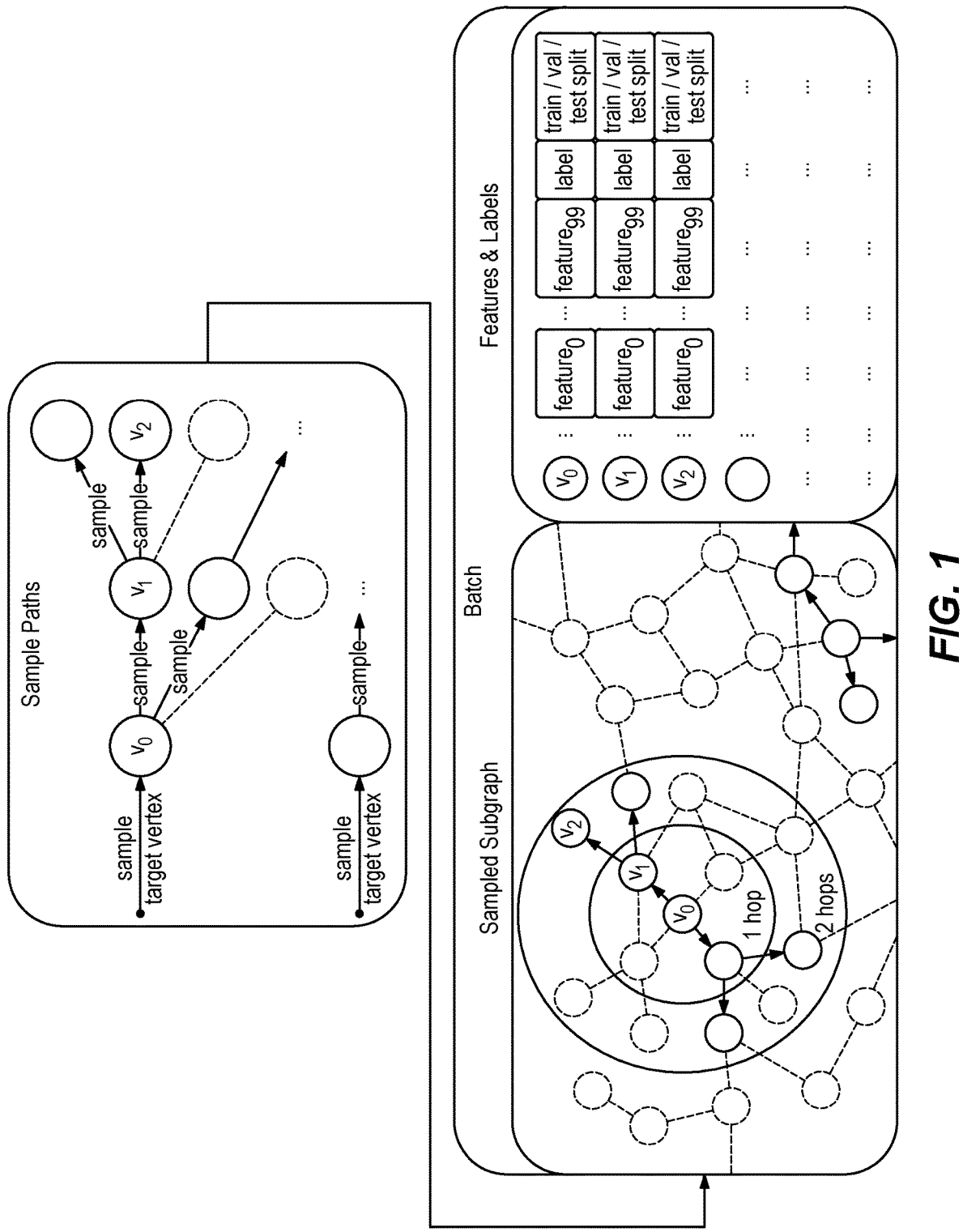
FIG. 1 is a schematic illustration of a procedure for sampling multi-hop neighborhoods, in accordance with embodiments of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In a distributed graph-ML system, it is first required to bring the to-be-analyzed data in a graph form and extract data batches that can be used from ML training. This disclosure focuses on the distributed extraction of multi-hop neighborhood batches for graph-ML, comprising a sampling routine that includes Push-Lazy-Push-Traversal.

In accordance with aspects of the disclosure, the Push-Lazy-Push-Traversal procedure can efficiently extract multi-hop neighborhoods in distributed graph engines, and thus can efficiently pipeline batches to existing ML training backends. The Push-Lazy-Push-Traversal procedure can be used to reduce the amount of data pushed during each hop of the neighborhood sampling process, thereby increasing the speed of batch extraction in a distributed computing environment. In particular embodiments, communication of certain information is deferred to a "lazy push" stage, reducing duplicate information communicated between machines. In addition, the memory usage of the batch extraction process can be limited by combining the Push-Lazy-Push-Traversal pattern with asynchronous distributed traversals.

2. Sampling Multi-Hop Neighborhoods with Push-Lazy-Push-Traversal

The Push-Lazy-Push-Traversal operates on top of distributed graphs, where vertices are partitioned on the machines of the cluster and edges might be either local or remote (i.e., leading to a remote vertex). Additionally, vertex features (also known as properties) are collocated with their owner vertices and the same applies for edges.

Each machine of the distributed graph engine cluster samples target vertices from the local set of vertices, and constructs a batch for the multi-hop neighborhoods of the target vertices. For most graph-ML algorithms, a batch includes (1) the structure of the sampled sub-graph, i.e., the sampled multi-hop neighborhoods of the target vertices, and (2) the features of vertices and edges as required by the graph-ML model and specified in a sampling configuration. A typical sampling configuration also includes how many target vertices to include per batch, how many neighbors to sample per hop in the multi-hop neighborhood sampling (also called "fanout"), and what features to extract. The representation of the features also depends on the graph and the model requirements. For example, string features may already be pre-processed into an embedding of a float array. A graph may be heterogeneous (i.e., include vertex/edge types, such as Person and Institution), in which different features are extracted for different vertex types. The batches can also include the splits of the vertices between training, validation and test set, for example in the form of binary masks.

At an abstract level, the following steps are performed for sampling such a batch with a multi-hop neighborhood:
1. Retrieve a sampling configuration specifying the number of target vertices, the number of hops, the fanout during the hops, and what features to extract.
2. For every batch:
   (a) Each graph engine machine locally samples target vertices.
   (b) The graph engine machines sample neighbors of target vertices (usually repeated for multiple hops/multiple layers deep). For every vertex and edge, features and train/test split information needs to be extracted. An edge may cross the machine boundary to a different machine.
   (c) Each machine of the distributed graph engine assembles a batch and transmits it to the ML backend for training or inference.

The bottleneck of this routine is typically step 2 (b) above, specifically the communication of edges and vertex features for neighbors that cross the graph partitioning boundary between machines. A pure push traversal on the graph-ML pipeline would push the entire information along the path of a neighborhood exploration. This can lead to duplicate information being communicated between the machines, as a vertex may be part of many paths and pushed over multiple hops.

In a Push-Lazy-Push-Traversal procedure according to embodiments of the disclosure, a push pattern may be employed while reducing the pushed information per hop to the "path tip" and deferring the communication of the remaining information to a "lazy push" stage. The path tip needs only to include the identifying information for the latest vertex in a path, and the identifying information for the host machine of the first vertex in the path. In various embodiments, communication of the remaining information to the host machine of the first vertex is deferred, and may be performed after or asynchronously to the neighborhood sampling; this ensures that the data of a vertex is sent only once per target remote machine. This information includes the sampled edges, the features of sampled vertices, and information about the train/validation/test split of the sampled vertices. It will be appreciated that for graph-ML workloads that extract a large number of features, Push-Lazy-Push-Traversals can result in substantial savings.

3. Integration of Graph Engine with ML Backend

In some embodiments, a procedure for extracting multi-hop neighborhoods from a graph engine may be integrated with an ML backend. This procedure does not restrict implementations to use a particular ML backend or require modifications to the ML backend.

The graph engine and the ML backend may be integrated with the following division of tasks and control: (1) The batch extraction is performed by the graph engine using Push-Lazy-Push-Traversal; this includes the orchestration of extracting multi-hop neighborhoods that cross the machine partition boundaries. (2) Asynchronously to the extraction of the batches by the graph engine, the completed batches are communicated to the graph-ML backend via a pipeline; the type of inter-process communication between the graph engine and the ML backend depends on the exact combination of graph engine and ML backend, and may use OS sockets, IP sockets, the filesystem or memory mapping. (3) The graph-ML model uses the batches for ML training, which may include forward pass, back-propagation, distributed gradient accumulation, and/or gradient updates.

The number of graph engine machine instances may vary relative to the number of ML trainers; furthermore, the graph engine instances and ML trainers may or may not be co-located on the same machines. In particular embodiments, deployment of the ML trainers relative to the graph engine instances can be one of the following:

(1) Graph engine+ML-training may run on different machines, possibly with a different number of machines for batch extraction/ML training. In an embodiment, the ML training can run on one machine with strong computing resources and GPUs, while only the graph engine is distributed.

(2) Graph engine+ML-training can have a 1:1 deployment, i.e., each machine hosts both a graph engine instance and an ML trainer. In this embodiment, the ML trainer consumes batches directly from the graph engine instance co-located on the same machine.

4. Enabling Graph-ML by Sampling Multi-Hop Neighborhoods Via Path Traversals

To support various graph-ML models, the Push-Lazy-Push-Traversal procedure needs to extract batches that contain subgraphs of multi-hop neighborhoods, as well as the corresponding information on features, labels and train/validation/test split. Referring to FIG. 1, this may be done as follows:

(1) A set of target vertices is sampled uniformly at random. These are the vertices for which the graph-ML model will make predictions. In the distributed setting, each machine samples the same number of target vertices from its local vertex partition.

(2) To sample a multi-hop neighborhood, paths are sampled: Beginning at the target vertices (e.g., $v_0$ in FIG. 1), a number of neighbors is sampled (e.g., $v_1$) and for each of these a path is created (e.g., $v_0 \rightarrow v_1$). This corresponds to sampling a 1-hop neighborhood.

(3) Each of these paths is then extended by sampling a certain number of neighbors of the last vertex in a path, and creating new paths (e.g., $v_0 \rightarrow v_1 \rightarrow v_2$ in FIG. 1).

(4) Step (3) is repeated as many times as the sampling configuration requires.

(5) The number of neighbors sampled with each "hop" is specified as the "fan-out" by the sampling configuration.

(6) The paths are combined into a batch that contains the sampled subgraph and corresponding information on features, labels and train/validation/test split. Depending on the ML backend, a different encoding scheme may be used for encoding the batch, e.g., COO format for an edge list representing the subgraph.

After the samples are created, the ML training backend can perform training. As the multi-hop neighbor sampling is a heavy operation and needs to extract a large number of features per vertex/edge out of the sampled subgraphs, it happens often that the sampling proves to be heavier to compute than the ML training. To implement the procedure described above, it therefore is important to efficiently sample and communicate paths in the setting of a distributed graph engine. Two approaches for accomplishing this are detailed below: Push-Traversal and Push-Lazy-Push-Traversal.

5. Push-Traversal

Figure 2:
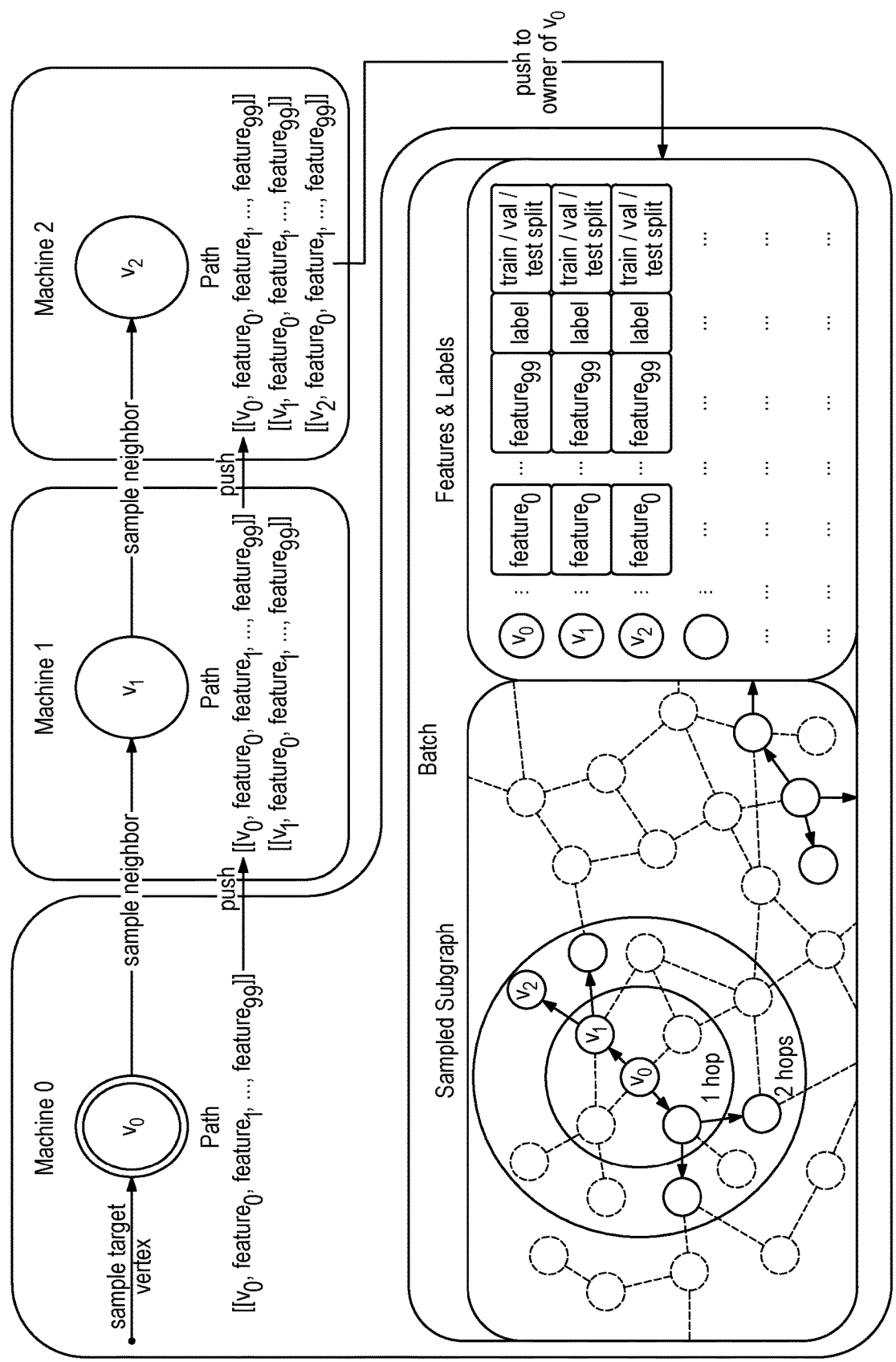
FIG. 2 is a schematic illustration of a procedure for push pattern communication between graph engines, in accordance with additional embodiments of the disclosure.

Referring to FIG. 2, a procedure for extraction of multi-hop neighborhoods with Push-Traversal includes sampling paths in a push pattern and assembling them into a batch on the host machine of the respective target vertex (the first vertex in the path). When extending a path by sampling a neighbor of the last vertex in the path, the current path is pushed to the machine hosting the neighbor. The advantage of this communication pattern is its simplicity; in addition, many graph engines have an affinity for a push pattern communication. However, employing this relatively simple pattern for extraction of multi-hop neighborhoods leads to a large amount of communicated data. This amount of data can be reduced by employing the Push-Lazy-Push-Traversal procedure instead of the Push-Traversal.

FIG. 2 shows the extraction of a single path; in practice, for performance reasons engines typically use bulk-synchronous execution, which involves the extraction of one full batch per machine (e.g., 2000 starting vertices per machine). This leads to far better parallelism and utilization of resources, but also to possible memory explosions.

6. Push-Lazy-Push Traversal

When sampling paths in a multi-hop neighborhood, a batch extraction with pure Push-Traversal pushes the entire paths, including all their edges and features, to the machine that hosts the vertex at the tip of the path. This can lead to substantial duplicate communication between the machines. Since the communication between machines is often the bottleneck in distributed graph-ML, it is desirable to improve this communication pattern.

Figure 3:
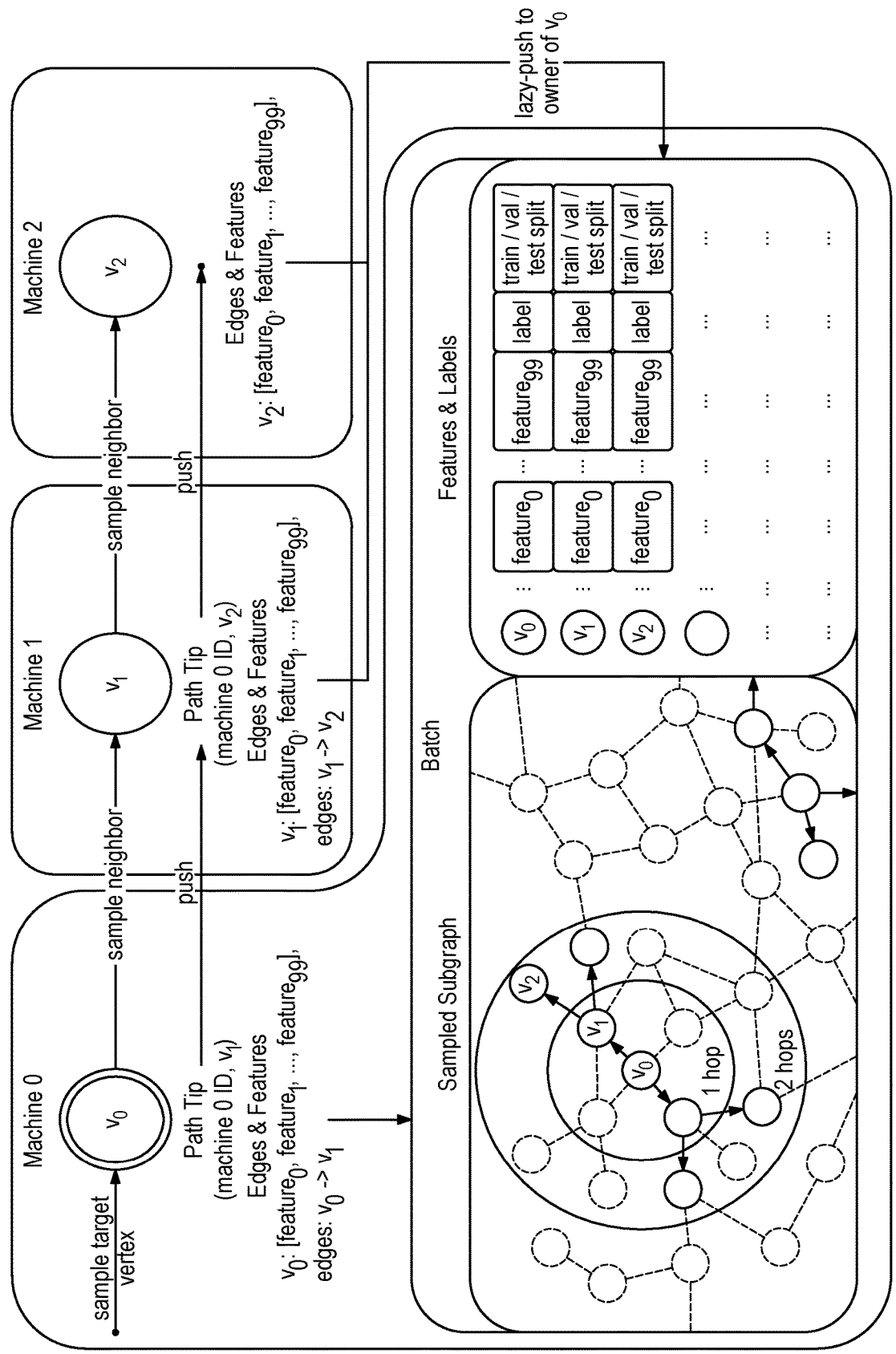
FIG. 3 is a schematic illustration of a communication pattern using Push-Lazy-Push-Traversal, in accordance with further embodiments of the disclosure.

The Push-Lazy-Push-Traversal procedure avoids the duplicate communications of the pure Push-Traversal by only pushing the tip of the sampled paths to the machine hosting the next vertex. Referring to FIG. 3, with each "hop" of sampling neighbors, the "path tip" sent to the host of a neighbor vertex only includes identifying information for the neighbor vertex and for the machine that hosts the first vertex in the path (the target vertex). Whenever a machine receives such a path tip including a machine ID and a vertex v, it stores in a data-structure that it needs to send the features of vertex v to the corresponding machine ID. Similarly, when sampling a neighbor u of vertex v, the machine stores in a data-structure that it needs to send edge (u, v) to the machine ID from the path tip. These data-structures, tracking which edges and features need to be sent to which ID, may be set data-structures and therefore omit any duplicate communication; for example, if vertex v and another vertex v' both sample neighbor u'. In this embodiment, synchronization of edges, vertex features and labels is deferred to an asynchronous or subsequent synchronization phase ("Lazy Push" phase) in which the features are extracted, either directly from the graph or from a separate distributed key-value store. In practice the features may be multidimensional float arrays with 1000 or more dimensions. The extracted features and the edges are then sent directly to the machine which hosts the first vertex in the path (the 'target vertex'). FIG. 3 illustrates the communication pattern on the sampled path $v_0 \rightarrow v_1 \rightarrow v_2$. In contrast to the communication in the Push-Traversal procedure, in the Push-Lazy-Push-Traversal procedure each feature information is only sent once, namely directly to the host of the target vertex $v_0$ which assembles the corresponding batch.

Even with the Push-Lazy-Push-Traversal, there may still be duplicate information. For example, in addition to the path $v_0 \rightarrow v_1 \rightarrow v_2$ there might be another path $v_0 \rightarrow v_3 \rightarrow v_2$ that is sampled. Two sampled paths starting at different target vertices may overlap; e.g., a path $v_4 \rightarrow v_2 \rightarrow v_3$ may be sampled. How often such an overlap occurs depends on the graph (size, diameter, occurrence of triangles, etc.) and the sampling configuration (number of target vertices, number of hops, fan-out). In some embodiments, such duplication can be removed by filtering the edge and feature communication with a set-based approach. In further embodiments, duplication in the communication of edges and features can be avoided by employing set data-structures to track the information that has been communicated in the lazy-push messages. In additional embodiments, if the system has available memory, the Push-Lazy-Push Traversal can maintain caches of serialized features even across batches, thereby eliminating duplicate communication of features across the sampling of all batches.

Figure 4:
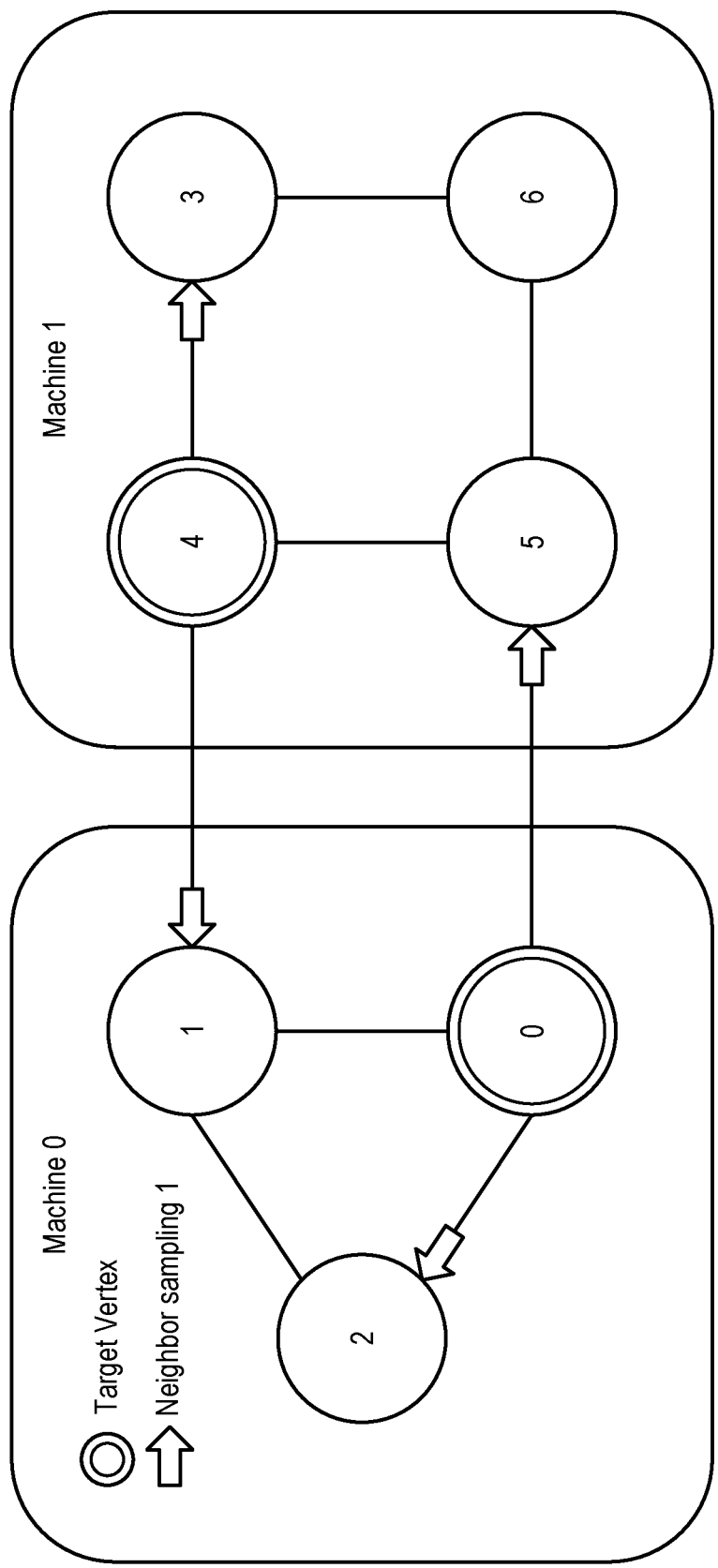
FIG. 4 is a schematic illustration of a procedure for batch extraction using Push-Lazy-Push-Traversal, in accordance with further embodiments of the disclosure.
Figure 5:
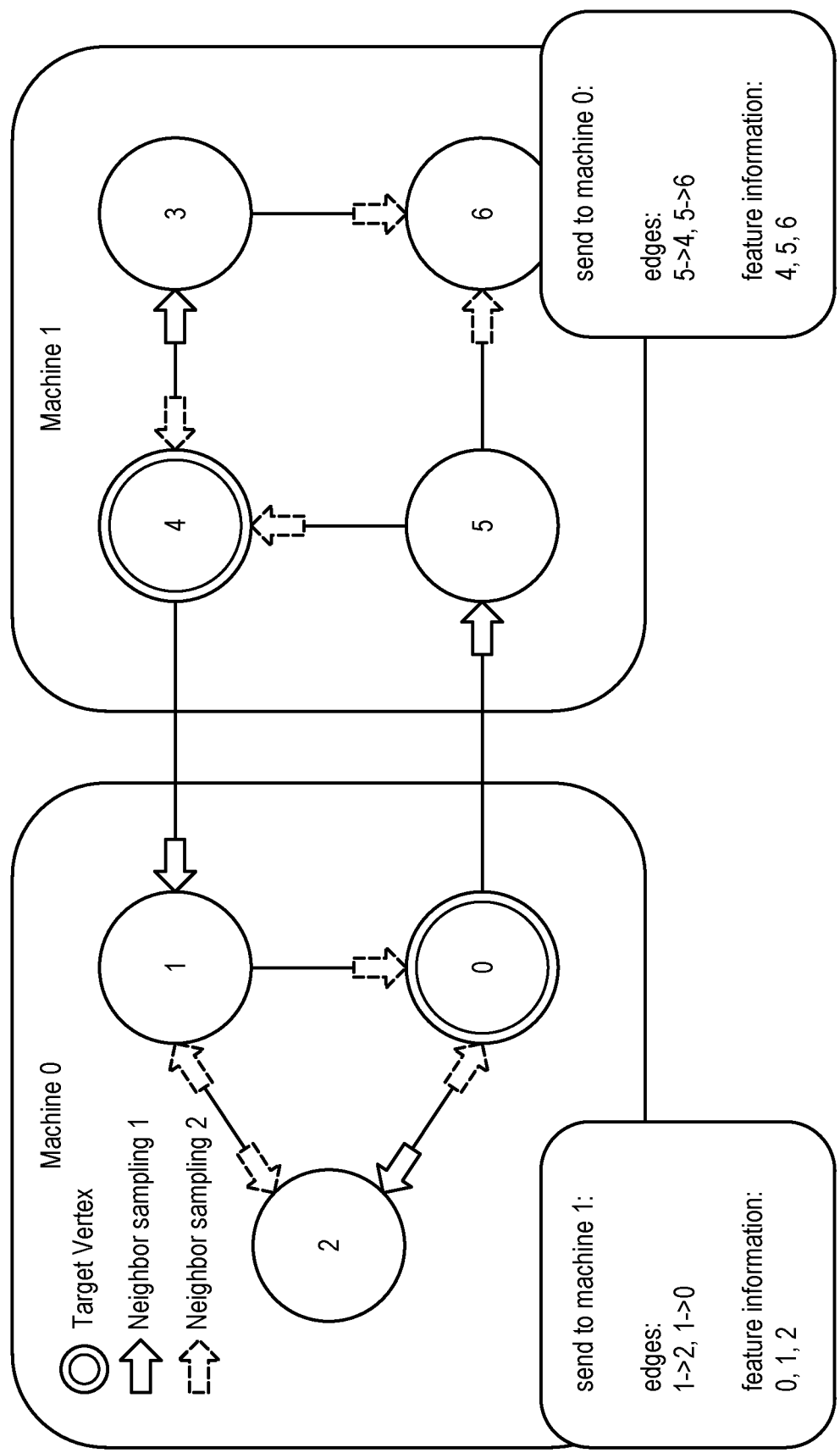
FIG. 5 is a schematic illustration of a procedure in which information is sent in a "lazy push" phase, in accordance with further embodiments of the disclosure.

An example invocation of a batch extraction with Push-Lazy-Push-Traversal is schematically illustrated in FIG. 4, with the sampled target vertices and sampled first degree neighbors being highlighted. With a pure Push-Traversal, the algorithm would send the complete paths (i.e., $4 \rightarrow 1$, $0 \rightarrow 5$) including edges, vertex features and information on train/validation/test splits between the machines. With the Push-Lazy-Push-Traversal, only the tip of the vertex is sent to the other machine, i.e., machine 0 receives the information from machine 1 that it needs to sample neighbors of vertex 1 for machine 1, and machine 1 receives the information that it needs to sample neighbors of vertex 5 for machine 0. After a second hop, the state of the machines may be as shown in FIG. 5 (depending on the sampling configuration and the randomness during sampling). As shown schematically in FIG. 5, the information regarding edges and vertex features is sent in a deferred, "lazy push" phase, which may be asynchronous to the neighborhood exploration or a subsequent synchronization phase.

The Push-Lazy-Push-Traversal reduces the information sent between machines. For example (as shown in FIG. 2), the naive Push-Traversal includes sending information about vertex 1 multiple times to machine 1, because vertex 1 was included in a different path for each instance when one of its neighbors was sampled. In contrast, the Push-Lazy-Push-Traversal avoids this duplication and the information regarding the vertex is sent only once, and directly to the machine that constructs the relevant batch.

As with Push-Traversals, the actual execution mode of Push-Lazy-Push traversals can be bulk-synchronous. In an embodiment, the procedure includes these steps: (1) Choose at random 2000 vertices per machine and add them to the traversal frontier; (2) Follow 1-hop the edges of the vertices from step (1), pushing the information; on the receiving side of the edge (which can be either local or remote) mark what information is needed to send to the sender in the lazy-push phase, and add the visited vertices to the current frontier of the traversal; (3) Repeat step (2) as many times as the graph-ML configuration asks; (4) Once completed, perform the lazy-push phase as described above.

7. Upper Bound for Data Transfer in Push-Traversal Vs. Push-Lazy-Push-Traversal

An upper bound for the expected amount of data communicated between machines can be calculated, based on the bandwidth utilized for communicating vertex features; this typically dominates the communication volume. Let S be the data size that is required to communicate the feature embedding for a single vertex (embedding+vertex ID). Let $f_0$ be the number of target vertices sampled per machine and $f_1$, $f_2, \ldots, f_k$ be the fan-out during the multi-hop neighborhood sampling. Assume that for every vertex v it holds that $\deg(v) \geq \max(f_1, f_2, \ldots, f_k)$ and that no paths overlap randomly. A graph that violates these assumptions (e.g., because the vertex degrees are low or because paths overlap via triangles) may require less communication than this upper bound suggests. Let M be the number of machines in the deployment of the distributed graph engine. Assume a random partitioning and hence a probability of $(M-1)/M$ that an edge crosses the machine boundary (since the sampling is performed by a graph engine with arbitrary partitioning). Then, for $k \geq 1$ an upper bound can be computed for the expected total bandwidth utilized for communicating vertex features for the naïve Push-Traversal:

$$\mathbb{E}[\text{Communication}] \leq S \underbrace{\sum_{l=0}^{k}}_{\substack{\text{per hop}}} \underbrace{\left(\prod_{i=0}^{l} f_i\right)}_{\substack{\text{number of} \\ \text{vertices sampled} \\ \text{in this hop}}} \underbrace{\left(\prod_{i=l+1}^{k} f_i\right)}_{\substack{\text{how many} \\ \text{paths include} \\ \text{each vertex}}} \underbrace{\frac{M-1}{M}}_{\substack{\text{probability} \\ \text{partition(neighbor)} \neq \\ \text{partition(target)}}}$$

$$= \frac{S(M-1)}{M} \sum_{l=0}^{k} \prod_{i=0}^{k} f_i = \frac{S(M-1)(k+1)}{M} \prod_{i=0}^{k} f_i$$

and for the Push-Lazy-Push-Traversal:

$$\mathbb{E}[\text{Communication}] \leq S \underbrace{\sum_{l=1}^{k}}_{\substack{\text{per hop}}} \underbrace{\prod_{i=0}^{l} f_i}_{\substack{\text{number of} \\ \text{vertices sampled} \\ \text{in this hop}}} \underbrace{\frac{M-1}{M}}_{\substack{\text{probability} \\ \text{partition(neighbor)} \neq \\ \text{partition(target)}}}$$

To give a numerical example, these equations may be instantiated with S=408 bytes (for a feature embedding of 100 floats at 32-bit precision and 8-byte vertex IDs), and a sampling configuration of 2000 target vertices with a fan-out of 15-10-5. With a graph engine deployment on M=8 machines, this results in an analytical upper bound on the expected size of the feature communication of 2142 MB for the Push-Traversal and 653.3 MB for the Push-Lazy-Push-Traversal. This is a worst-case upper bound that does not account for the filtering of duplicates that arise when two paths randomly overlap, e.g. via a triangle in the graph or when two paths started a different target vertices overlap coincidentally. Overall, this analytical upper bound provides a good indication of the reduction in communication size due to the Push-Lazy-Push-Traversal approach as compared to Push-Traversal.

8. Limiting Memory Consumption Using Asynchronous Distributed Traversals

As the fan-out and the number of hops in the multi-hop neighborhood increase, the multi-hop exploration can lead to memory explosions and thus to a sharp increase in the memory requirement for the graph engine, even when Push-Lazy-Push traversals are performed. In various embodiments, a Push-Lazy-Push-Traversal procedure can be executed in combination with distributed asynchronous traversals in to control the memory usage.

In particular embodiments, instead of the bulk-synchronous computation model, the batch exploration can be bootstrapped with asynchronous distributed traversals, allowing to deterministically control the maximum memory these explorations can take. This modification affects the neighbor sampling part of the batch exploration, but not the Push-Lazy part; that is, asynchronously to the neighborhood sampling, the lazy push for the edges and features is employed as described above with regard to Push-Lazy-Push-Traversal. In further embodiments, completed paths are asynchronously combined into batches for the ML backend. To ensure that this batch creation memory stays under control, a flow-control mechanism can be employed, where data is exchanged and batches created only if they would not violate memory requirements. In one embodiment, the engine can generate the batches directly on disk to avoid any heavy memory usage.

By employing this asynchronous scheme for the Push-Lazy-Push-Traversal, the memory usage of the system can be effectively controlled while maintaining the benefits of the reduced communication between graph engine instances.

9. Integration with an ML Backend

Figure 6:
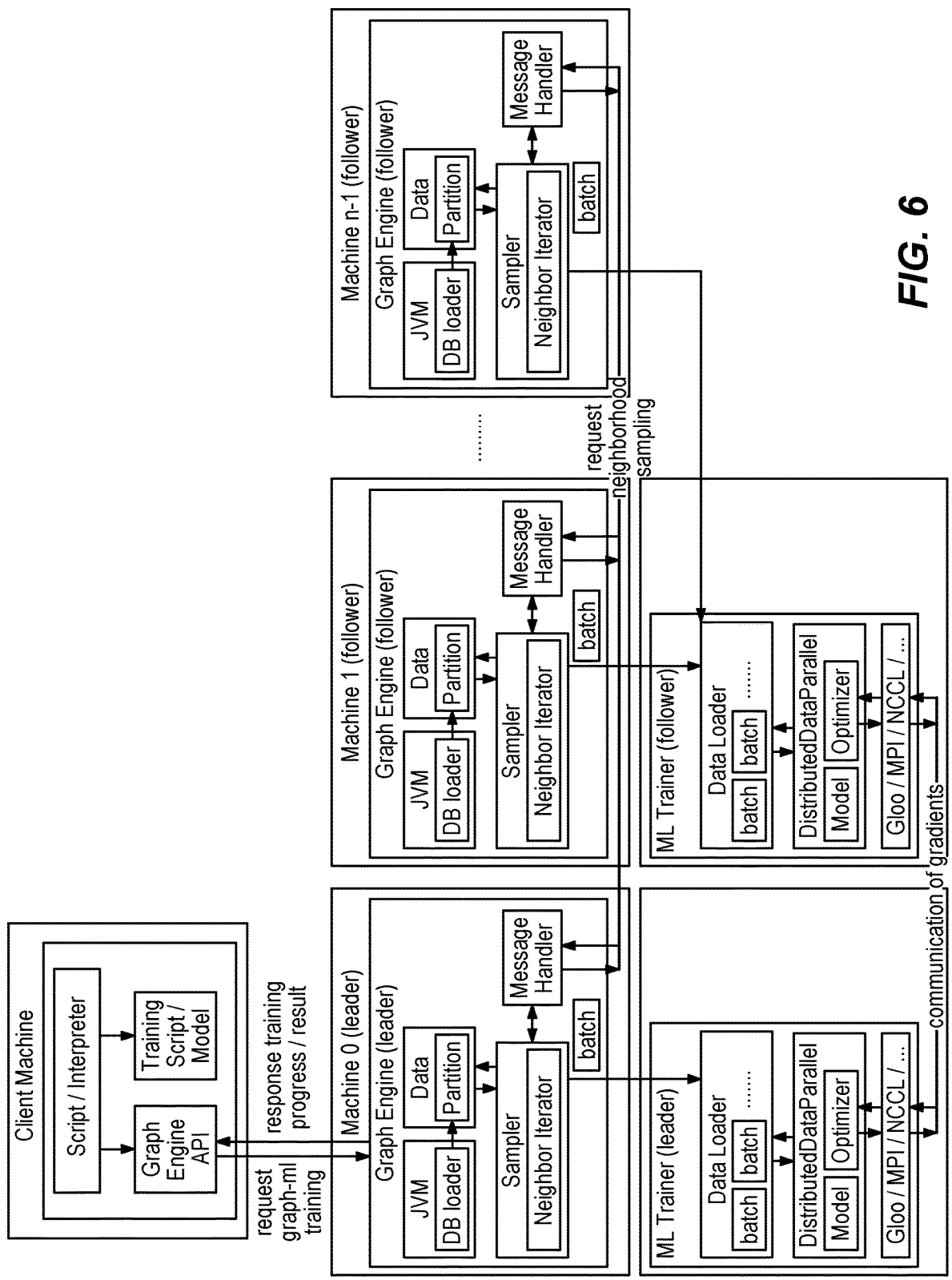
FIG. 6 schematically illustrates integration of a graph engine with an ML backend, in accordance with additional embodiments of the disclosure.

FIG. 6 schematically illustrates integration of a graph engine with an ML backend, in accordance with additional embodiments of the disclosure. In various embodiments, the graph engine instances and the ML backend instances may be co-located on the same machines in a one-to-one correspondence, or may be hosted by separate machines as shown in the figure. In the later scenarios the number of graph engine instances and ML backend instances may be arbitrary, and a scenario with multiple producers of batches (graph engine instances) and multiple consumers of batches (ML backend instances) arises.

In either deployment scenario the user may invoke the graph engine to perform ML training or inference according to the specification of a graph, neighborhood sampling configuration, ML model, and/or a training/inference routine.

The graph engine follows these instructions and proceeds to sample multi-hop neighborhoods in a distributed fashion, and assemble them into batches as required by the ML model. It is at this stage where the Push-Lazy-Push-Traversal is effective to improve the speed of the graph-ML pipeline. The batches are serialized and sent asynchronously to the ML backend instances. The communication channel for this serialized data stream depends on the deployment scenario and can be via OS socket, IP socket or filesystem. The ML backend then deserializes the received data stream into the batches and performs ML training or inference according to the specified training/inference routine.

10. Hardware Overview

Figure 7:
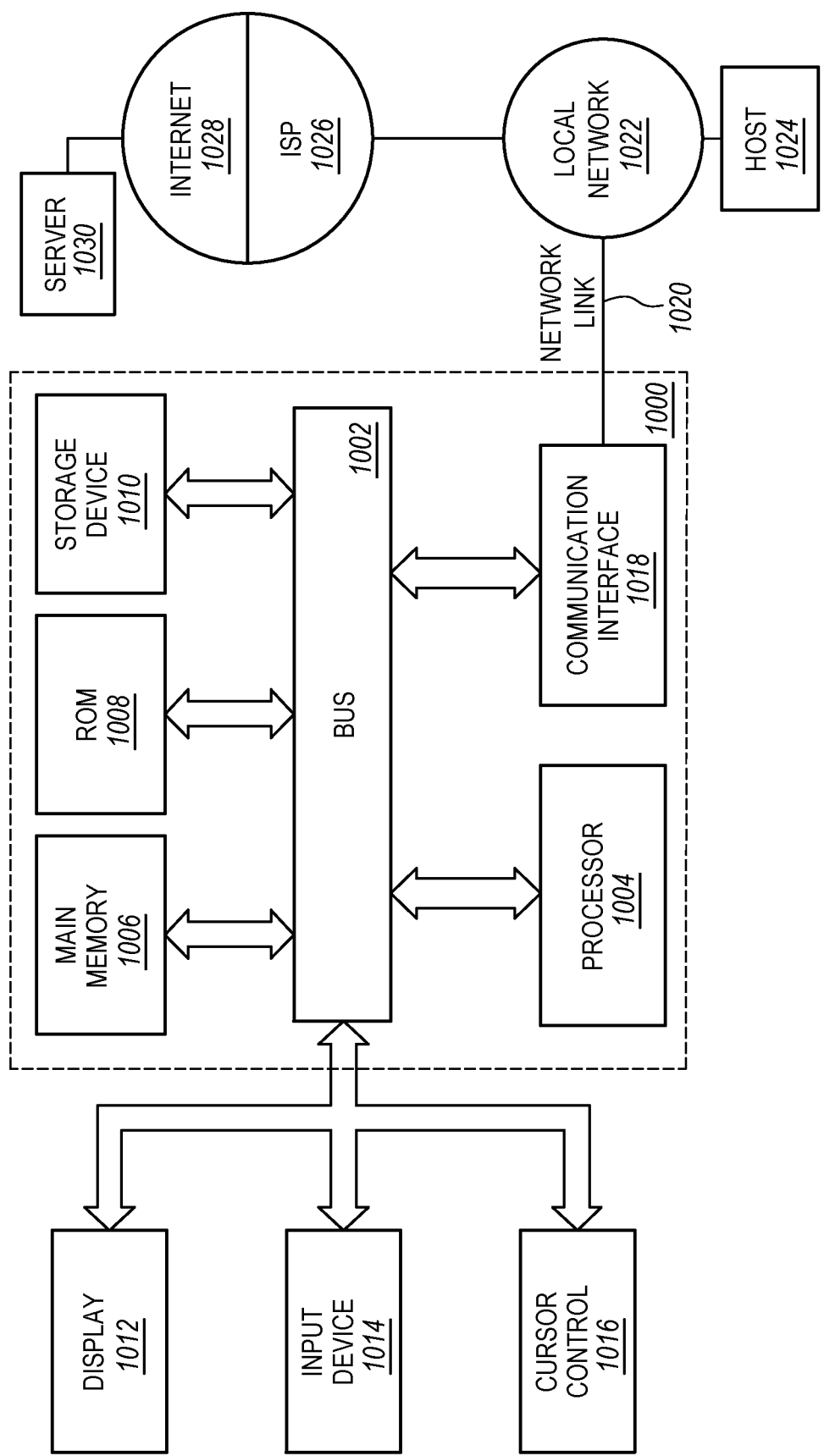
FIG. 7 is a block diagram that illustrates a computer system upon which an embodiment of the invention may be implemented.

FIG. 7 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may be used for implementing one or more of the techniques described herein. According to one embodiment, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to storage media and transmission media.

Storage media include both non-volatile media and volatile media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

11. Software Overview

Figure 8:
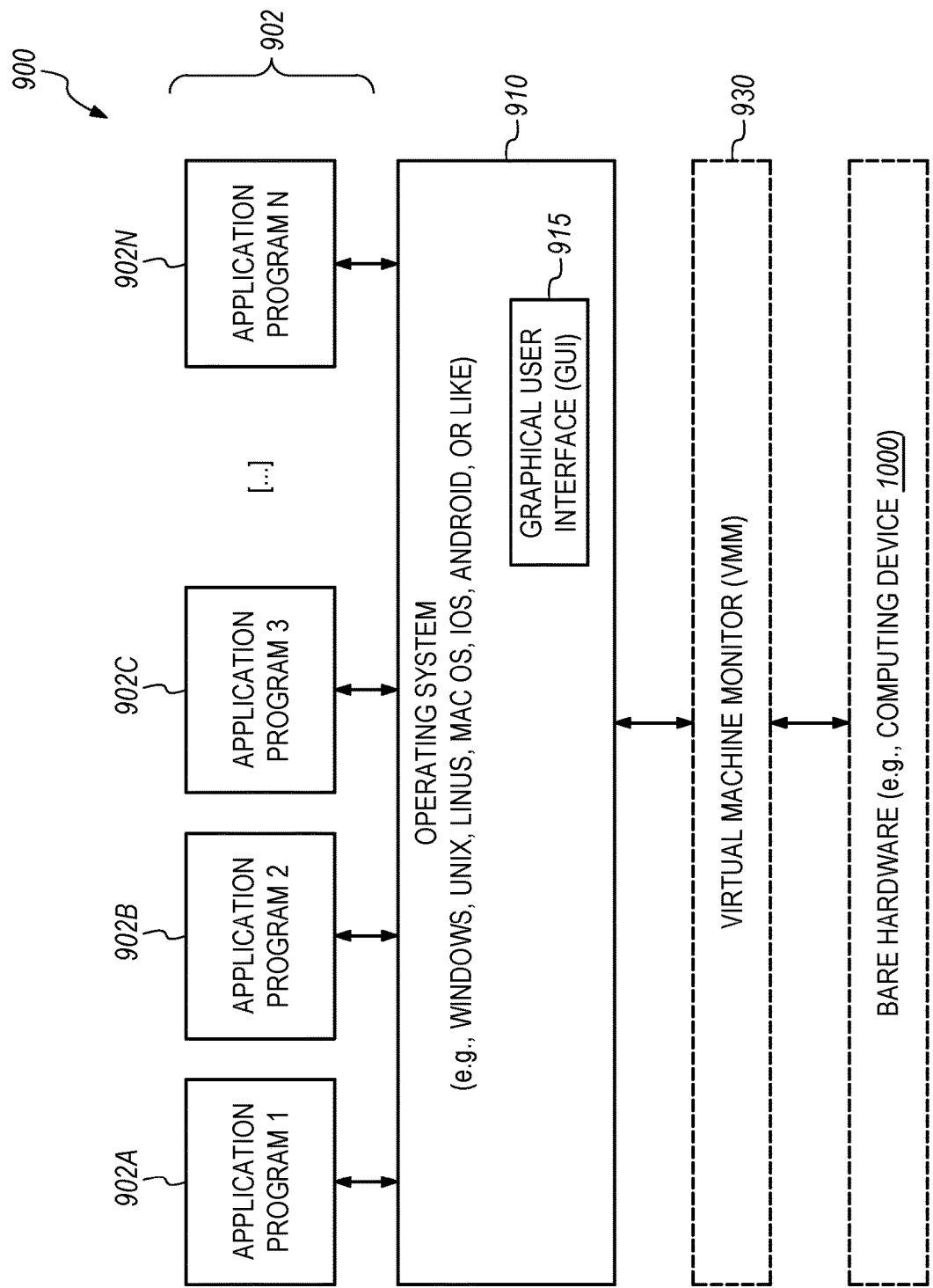
FIG. 8 is a block diagram of a software system that may be employed for controlling the operation of a computer system upon which an embodiment of the invention may be implemented.

FIG. 8 is a block diagram of a software system 900 that may be employed for controlling the operation of a computer system upon which an embodiment of the invention may be implemented. In particular, software system 900 may be employed for controlling the operation of computing system 1000. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900, which may be stored in system memory (RAM) 1006 and on fixed storage (e.g., hard disk or flash memory) 106, includes a kernel or operating system (OS) 910. The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 106 into memory 1006) for execution by the system 900.

The applications or other software intended for use on computer system 1000 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 1004) of computer system 1000. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 1000.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

12. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

13. Extensions and Alternatives

One or more of the functions attributed to any process described herein, according to one or more embodiments, may be performed any other logical or physical entity, according to one or more embodiments. In various embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

A Push-Lazy-Push-Traversal procedure is described herein for a distributed graph where vertex properties are stored jointly with the graph structures, but can also be employed if vertex properties are stored in a distributed key-value store.

It will be appreciated that paths in distributed graphs can be sampled more efficiently with a Push-Lazy-Push-Traversal approach, as compared with a Push-Traversal approach. A Push-Lazy-Push-Traversal procedure for batch extraction from distributed graphs can leverage the strengths of push patterns while reducing the amount of data transfers. More generally, Push-Lazy-Push-Traversal can provide improved performance and scalability by significantly reducing the amount of data exchanged during multi-hop neighborhood traversals.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   performing a sampling procedure for paths on a multi-hop distributed graph, the graph including a plurality of vertices partitioned on a plurality of machines, a sampled path comprising a first vertex hosted on a first machine of the plurality of machines and a second vertex hosted on a second machine of the plurality of machines and neighboring the first vertex, the sampling procedure including:
      communicating, by the first machine to the second machine, first path information comprising an identifier for the second vertex and an identifier for a target vertex of the sampled path, the target vertex hosted on a target host machine of the plurality of machines;
      storing, by the first machine in a first data structure, a first indication that communication of edge information regarding the first vertex and the second vertex is required;
      storing, by the second machine in a second data structure, a second indication that communication of feature information regarding the second vertex is required;
      communicating, by the first machine to the target host machine, the edge information; and
      communicating, by the second machine to the target host machine, the feature information;
   wherein communication of the edge information and communication of the feature information are deferred to a lazy push stage that occurs after communication of the first path information.

2. The computer-implemented method according to claim 1, wherein at least one of the communication of the edge information and the communication of the feature information is performed subsequent to communication of the first path information.

3. The computer-implemented method according to claim 1, wherein at least one of the communication of the edge information and the communication of the feature information is performed asynchronously with respect to communication of the first path information.

4. The computer-implemented method according to claim 1, wherein the first vertex is the target vertex of the sampled path.

5. The computer-implemented method according to claim 1, wherein the feature information is extracted from the graph.

6. The computer-implemented method according to claim 1, wherein the feature information is extracted from a distributed key-value store.

7. The computer-implemented method according to claim 1, wherein the sampling procedure is performed in accordance with a sampling configuration.

8. The computer-implemented method according to claim 1, wherein the target host machine assembles a data batch based on the sampled path, the feature information and the edge information.

9. The computer-implemented method according to claim 8, further comprising training a graph machine learning (ML) model based on the data batch.

10. A non-transitory computer-readable medium comprising instructions executable by a processor to perform a sampling procedure for paths on a distributed graph, the graph including a plurality of vertices partitioned on a plurality of machines, a sampled path comprising a first vertex hosted on a first machine of the plurality of machines and a second vertex hosted on a second machine of the plurality of machines and neighboring the first vertex, the sampling procedure including:
   communicating, by the first machine to the second machine, first path information comprising an identifier for the second vertex and an identifier for a target vertex of the sampled path, the target vertex hosted on a target host machine of the plurality of machines;
   storing, by the first machine in a first data structure, a first indication that communication of edge information regarding the first vertex and the second vertex is required;

storing, by the second machine in a second data structure, a second indication that communication of feature information regarding the second vertex is required;

communicating, by the first machine to the target host machine, the edge information; and communicating, by the second machine to the target host machine, the feature information;

wherein communication of the edge information and communication of the feature information are deferred to a lazy push stage that occurs after communication of the first path information.

11. The non-transitory computer-readable medium of claim 10, wherein at least one of the communication of the edge information and the communication of the feature information is performed subsequent to communication of the first path information.

12. The non-transitory computer-readable medium of claim 10, wherein at least one of the communication of the edge information and the communication of the feature information is performed asynchronously with respect to communication of the first path information.

13. The non-transitory computer-readable medium of claim 10, wherein the first vertex is the target vertex of the sampled path.

14. The non-transitory computer-readable medium of claim 10, wherein the sampling procedure is performed in accordance with a sampling configuration.

15. The non-transitory computer-readable medium of claim 10, wherein the target host machine assembles a data batch based on the sampled path, the feature information and the edge information, and wherein the instructions further comprise instructions for training a graph machine learning (ML) model based on the data batch.

16. A system comprising:

a processor; and a memory that stores executable instructions that, when executed by the processor, facilitate performance of operations, the operations comprising:

performing a sampling procedure for paths on a multi-hop distributed graph, the graph including a plurality of vertices hosted on a plurality of machines, a sampled path comprising a first vertex hosted on a first machine of the plurality of machines and a second vertex hosted on a second machine of the plurality of machines and neighboring the first vertex, the sampling procedure including:

communicating, by the first machine to the second machine, first path information comprising an identifier for the second vertex and an identifier for a target vertex of the sampled path, the target vertex hosted on a target host machine of the plurality of machines;

storing, by the first machine in a first data structure, a first indication that communication of edge information regarding the first vertex and the second vertex is required;

storing, by the second machine in a second data structure, a second indication that communication of feature information regarding the second vertex is required;

communicating, by the first machine to the target host machine, the edge information; and communicating, by the second machine to the target host machine, the feature information;

wherein communication of the edge information and communication of the feature information are deferred to a lazy push stage that occurs after communication of the first path information.

17. The system of claim 16, wherein at least one of the communication of the edge information and the communication of the feature information is performed subsequent to communication of the first path information.

18. The system of claim 16, wherein at least one of the communication of the edge information and the communication of the feature information is performed asynchronously with respect to communication of the first path information.

19. The system of claim 16, wherein the first vertex is the target vertex of the sampled path.

20. The system of claim 16, wherein the target host machine assembles a data batch based on the sampled path, the feature information and the edge information, and wherein the operations further comprise training a graph machine learning (ML) model based on the data batch.

* * * * *

UNITED STATES PATENT AND TRADEMARK OFFICE
CERTIFICATE OF CORRECTION

| | | |
|---|---|---|
| PATENT NO. | : 12,361,068 B2 | Page 1 of 1 |
| APPLICATION NO. | : 18/593663 | |
| DATED | : July 15, 2025 | |
| INVENTOR(S) | : Trigonakis et al. | |

It is certified that error appears in the above-identified patent and that said Letters Patent is hereby corrected as shown below:

On the Title Page

On page 2, Column 1, under item (56), Other Publications, Line 26, delete ""Cachesensitive" and insert -- "Cache-sensitive --, therefor.

On page 2, Column 1, under item (56), Other Publications, Line 27, delete "Taversals" and insert -- Traversals --, therefor.

On page 2, Column 2, under item (56), Other Publications, Line 14, delete "Endowmwnt," and insert -- Endowment, --, therefor.

In the Specification

In Column 7, Line 46, delete "(target)" and insert -- (origin) --, therefor.

Signed and Sealed this
Thirtieth Day of December, 2025

John A. Squires
*Director of the United States Patent and Trademark Office*